United States Patent
Hoffmann

(10) Patent No.: US 7,584,928 B2
(45) Date of Patent: Sep. 8, 2009

(54) DROGUE PARACHUTE DRAG FORCE ACTUATED PROGRAMMABLE CONTROLLER TO GENERATE AN EVENT TRIGGER SIGNAL

(75) Inventor: Frank Hoffmann, Apple Valley, MN (US)

(73) Assignee: BRS, Incorporated, Saint Paul, MN (US)

( * ) Notice: Subject to any disclaimer, the term of this patent is extended or adjusted under 35 U.S.C. 154(b) by 0 days.

(21) Appl. No.: 12/011,075

(22) Filed: Jan. 24, 2008

(65) Prior Publication Data

US 2009/0189022 A1   Jul. 30, 2009

(51) Int. Cl.
*B64D 17/52* (2006.01)
(52) U.S. Cl. .................. 244/149; 244/150; 244/152; 244/137.3
(58) Field of Classification Search .......... 244/141, 244/147, 150, 152, 138 R, 142, 149, 137.3
See application file for complete search history.

(56) References Cited

U.S. PATENT DOCUMENTS

| 4,440,366 | A | * | 4/1984 | Keeler et al. ............ 244/138 R |
| 4,505,444 | A | | 3/1985 | Martin |
| 4,651,957 | A | | 3/1987 | Minnich, II |
| 4,709,885 | A | * | 12/1987 | Martin ........................ 244/141 |
| 4,765,570 | A | | 8/1988 | Herndon |
| 5,064,151 | A | | 11/1991 | Cerimele et al. |
| 5,104,066 | A | * | 4/1992 | Aronne .................. 244/122 AE |
| 5,362,016 | A | * | 11/1994 | Aronne .................. 244/122 AE |
| 5,474,257 | A | | 12/1995 | Fisher et al. |
| 5,673,873 | A | | 10/1997 | Stemme |
| 5,884,863 | A | | 3/1999 | Fisher et al. |
| 5,899,415 | A | | 5/1999 | Conway et al. |
| 6,883,756 | B2 | | 4/2005 | Preston |
| 6,889,942 | B2 | | 5/2005 | Preston |
| 7,059,570 | B2 | | 6/2006 | Strong |
| 2005/0230555 | A1 | | 10/2005 | Strong |

* cited by examiner

*Primary Examiner*—J. Woodrow Eldred
(74) *Attorney, Agent, or Firm*—Kinney & Lange PA

(57) ABSTRACT

A parachute control system is actuated primarily by drogue parachute drag force. Drag force is used as a proxy for vehicle airspeed. The control system uses altitude and force sensors combined with a chronograph to determine the state of a deployed drogue parachute. It then compares the sensed condition with a condition defined by preset altitude, force, and time values. Once both altitude and drogue parachute drag force are below certain maximum values and within predetermined time windows, an event trigger signal is generated.

18 Claims, 3 Drawing Sheets

DROGUE PARACHUTE DRAG FORCE ACTUATED PROGRAMMABLE CONTROLLER TO GENERATE AN EVENT TRIGGER SIGNAL

BACKGROUND

This invention relates to parachute systems and methods of controlling parachute deployment.

Drogue parachutes are commonly deployed for stabilization or airspeed retardation. Often, the drogue parachute is deployed to decelerate an object to an airspeed at which a larger parachute can be safely inflated. Drogue parachutes are commonly used in aerial cargo and personnel delivery systems, spacecraft landing systems, and on aircraft and aircraft ejection seats.

It is often necessary while towing a drogue parachute to provide a trigger signal that initiates further events once certain parameters are met. Drogue parachutes typically are not themselves directly used to trigger any subsequent events. Rather, subsequent events are triggered by independent sensing of predetermined parameters. For example, an air pressure threshold corresponding to a target altitude triggers release of the drogue parachute and deployment of the main parachute as shown in U.S. Pat. No. 5,899,415. Alternative systems trigger release after a predetermined time since drogue deployment, or once measured airspeed drops below a predetermined value. Examples are shown in U.S. Pat. Nos. 5,474,257, 5,884,863 and 7,059,570.

Other systems employ more sophisticated triggering schemes incorporating combinations of altitude, time, and/or airspeed data. One common scheme triggers drogue parachute release and main parachute deployment only when both altitude and airspeed have dropped below predetermined values, as shown in U.S. Pat. No. 4,505,444. Another scheme releases the drogue parachute once the drogue parachute has both remained deployed for a predetermined time interval and dropped below a predetermined altitude threshold. U.S. Pat. Nos. 5,064,151 and 6,889,942 use this system.

Parachute systems capable of incorporating multiple parameters into the event triggering scheme enable superior system reliability and performance. Prior art systems in which event triggering is a function of airspeed, however, require independent means for directly sensing airspeed. The autonomy and utility of such systems is therefore limited.

SUMMARY

The present invention provides a system and method in which a towed drogue parachute autonomously triggers subsequent events as a function of sensed drogue parachute drag force. Such events may include drogue parachute release, main parachute deployment, or both. This system is capable of generating an event trigger signal at targeted airspeeds without requiring direct airspeed sensing. Furthermore, it can trigger further events as a function of multiple trigger conditions with complete autonomy.

In one embodiment, an event trigger signal is generated as a function of altitude, drag force, and time. Preset maximum altitude, maximum force, and time interval values define the desired triggering condition. Maximum altitude is set as necessary to render drag force assumptions valid. A maximum force value is calculated from a target airspeed threshold and the physical and performance characteristics of the drogue parachute. Using target force as a proxy for achieving a desired airspeed threshold eliminates reliance on vehicle sensors. A chronograph regulates the sequence of trigger events. It ensures that the drogue parachute is allowed sufficient time to inflate and that the event is triggered only by a "true" reading of force below the trigger level. When sensed altitude, drag force, and time values all satisfy the stored triggering condition, the event is triggered.

The present invention may provide redundant safety systems. For example, the system may be configured so that the triggering condition cannot be reached without first achieving a certain minimum drag force. This may be necessary in such circumstances when the drogue parachute, upon release, acts as a pilot chute to extract the main parachute and it being more desirable to not continue with subsequent events in case of a drogue failure. In addition, event triggering independent of the sensed drag force may be enabled if a certain time interval has passed since drogue parachute deployment.

DETAILED DESCRIPTION

Figure 1:
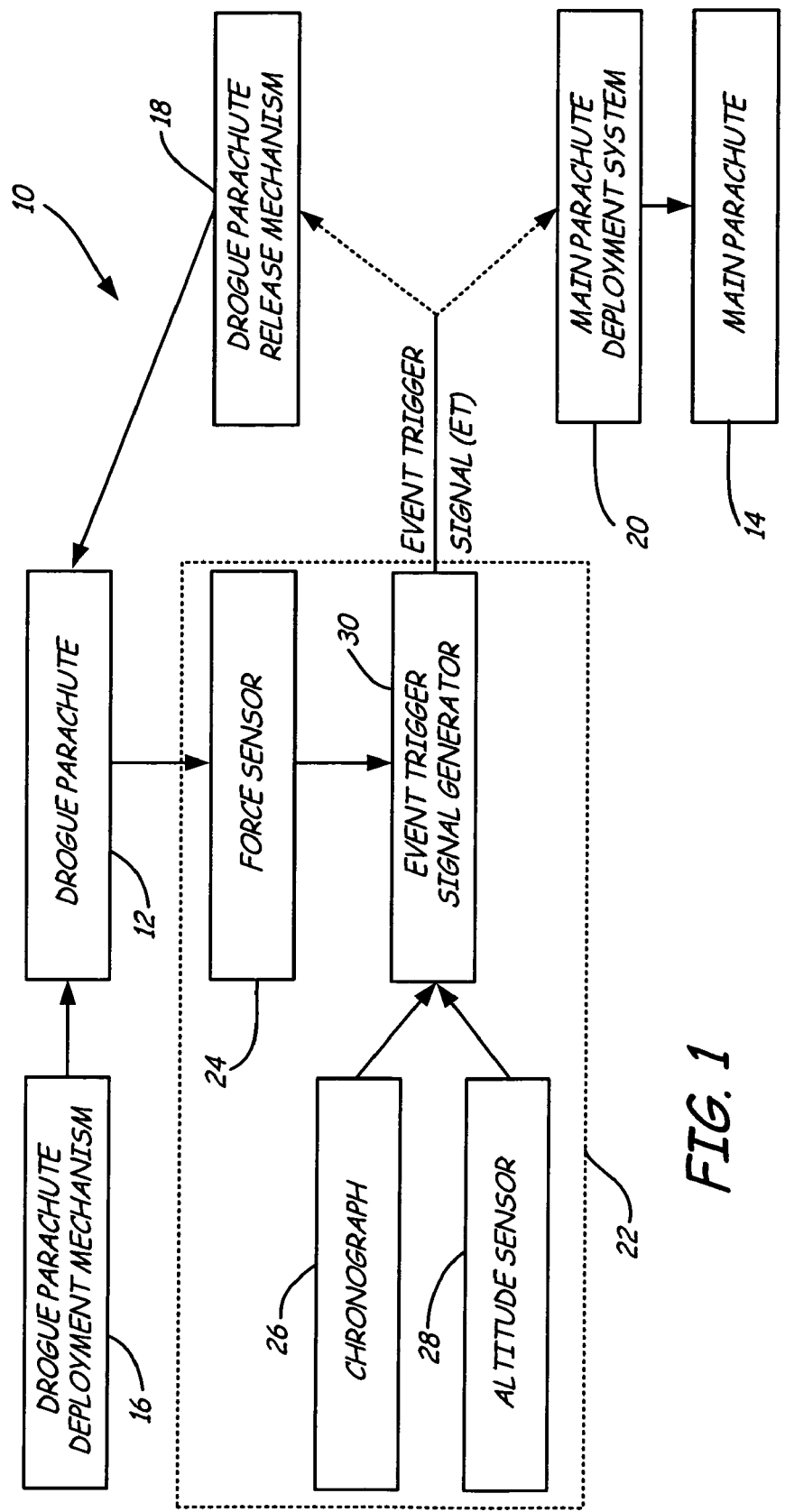
FIG. 1 is a block diagram showing the components of a parachute system that includes a parachute control system.

FIG. 1 is a block diagram of parachute system 10, which includes drogue parachute 12, main parachute 14, drogue parachute deployment mechanism 16, drogue parachute release mechanism 18, main parachute deployment mechanism 20, and control system 22. Components of control system 22 include force sensor 24, chronograph 26, altitude sensor 28, and event trigger signal generator 30.

Drogue parachute deployment mechanism 16 initiates deployment of drogue parachute 12. Drogue parachute 12 is attached directly to force sensor 24. Drogue parachute 12 inflates following deployment, generating a drag force. Force sensor 24 measures the drag force and transmits measured drag force to event trigger signal generator 30. Force sensor 24 may comprise any mechanical or electrical device capable of measuring tensile force. Chronograph 26 tracks time and inputs time values into event trigger signal generator 30. Altitude sensor 28 determines altitude of the parachute system and transmits measured altitude to event trigger signal generator 30. Altitude sensor 28 may comprise a GPS or Radar sensor, a mechanism that measures atmospheric pressure and correlates this into an altitude, a barostat, or any other device capable of measuring altitude. Such altitude sensing devices are well known in the field. Sensors 24, 26, and 28 function autonomously, independent of host vehicle sensors. Event trigger signal generator 30 incorporates values received from sensors 24, 26, and 28 to generate event trigger signal ET as a function of drogue parachute drag force, time, and altitude. Event trigger signal ET may either release drogue parachute 12 by activating drogue parachute release mechanism 18 or deploy main parachute 14 by activating main parachute deployment mechanism 20 or alternatively, it may both deploy main parachute 14 and release drogue parachute 12. Drogue parachute release mechanism 18 may comprise a pyrotechnic cutter or some other release mechanism well known in the field. ET may also act as a signal that can be used by any other peripheral equipment attached.

Once the drogue parachute deployment mechanism 16 has been activated by an outside event, parachute system 10 is capable of functioning autonomously, requiring no information input or control from the host vehicle. Furthermore, system 10 enables main parachute 14 deployment, drogue parachute 12 release, or both at a specified airspeed without requiring actual measurement of airspeed.

Control system 22 is actuated primarily by drogue parachute 12 drag force. Event trigger signal generator 30 stores preset altitude, drogue parachute drag force, and time values defining an event trigger condition. Event trigger signal generator 30 is also capable of comparing sensed altitude, drogue parachute drag force, and time values with the stored trigger condition. Finally, event trigger signal generator 30 is capable of recognizing when current conditions satisfy the stored trigger condition and thereafter generating event trigger signal ET. Storing and comparing altitude, drogue parachute drag force, and time values, as well as generating event trigger signal ET, may be accomplished by either mechanical or electronic means. In an exemplary embodiment, a programmable electronic microprocessor stores values defining the event trigger condition. The programmable microprocessor used is capable of continuously comparing values received from altitude, drogue parachute drag force, and time sensors to stored values. The programmable microprocessor further is capable of producing an electronic event trigger signal ET once it recognizes the event trigger condition has been achieved.

Figure 2:
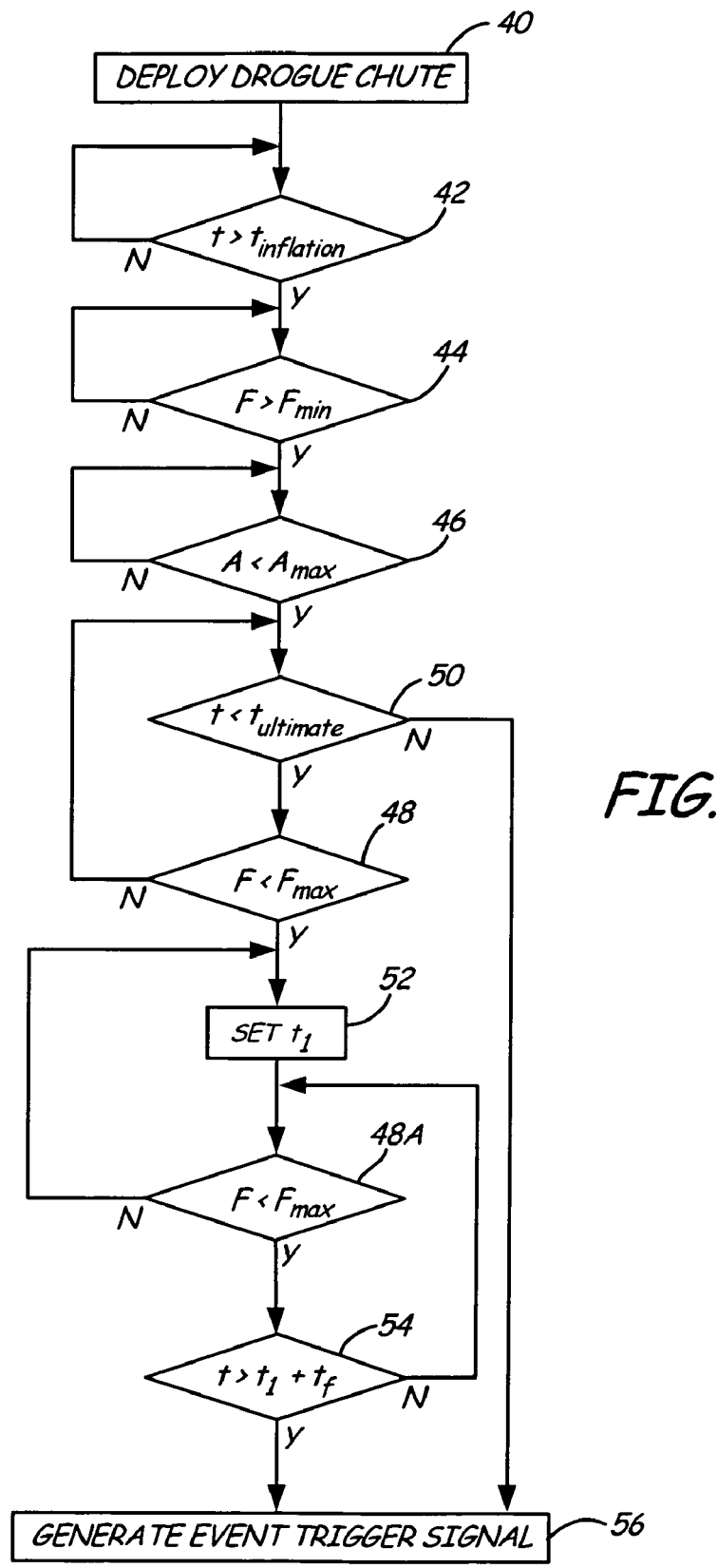
FIG. 2 is a block diagram illustrating the method by which an event trigger signal is generated as a function of drogue parachute drag force, altitude, and time.

FIG. 2 shows the method by which control system 22 of FIG. 1 produces event trigger signal ET as a function of altitude, drogue parachute drag force, and time. Control system 22 is activated by step 40, deployment of drogue parachute 12. At this time, drogue parachute drag force sensor 24, chronograph sensor 26, and altitude sensor 28 begin to measure values. In step 42, the event trigger signal generator 30 delays further events until measured time since drogue chute deployment t exceeds the preset value of $t_{inflation}$. Time $t_{inflation}$ corresponds to a predetermined time from drogue chute deployment to full drogue chute inflation. The value of this preset inflation time is specific to a chosen vehicle and drogue parachute combination. Once the event trigger signal generator determines measured time is greater than $t_{inflation}$, step 42 is complete.

Step 44 shows an optional safety check that may be incorporated into parachute system 10. In step 44, the event trigger signal generator prevents passage to step 46 until sensed drogue parachute drag force F is above a threshold value of $F_{min}$. If correctly deployed, the drogue parachute should exert a drag force of predictable magnitude on the force sensor following completion of $t_{inflation}$. By setting $F_{min}$ near this expected value, completion of step 44 verifies successful drogue parachute deployment.

Step 46 compares sensed altitude A with preset maximum trigger altitude $A_{max}$ stored in the event trigger signal generator. Step 46 is necessary to ensure that the vehicle and its occupants have reached a breathable atmosphere before initiating further events, such as deploying a main parachute. Furthermore, step 46 is necessary for assumptions of constant air density used in step 48 to be relatively accurate within predefined boundaries. Because air density decreases as altitude increases, step 46 guarantees that step 48 is not initiated until air density reaches a threshold level corresponding to air density at $A_{max}$.

Step 48 compares sensed drogue parachute drag force F with preset maximum drag force $F_{max}$. Drag force F and preset maximum drag force $F_{max}$ serve as proxy values for airspeed V and target airspeed $V_{max}$. Airspeed V and drag force F are related according to the following formula, where air density ($\rho$), drogue parachute coefficient of drag ($C_D$), and drogue parachute surface area (S) are constants:

$$V=\sqrt{(2F/C_D\rho S)} \qquad \text{Equation 1}$$

As dynamic air pressure decreases with altitude for a given true airspeed, the measured drag force F will be smaller at higher altitudes for a given true airspeed than at lower altitudes. This may cause control system 22 to believe that the vehicle's airspeed is lower than it actually is. This natural phenomenon has to be offset by choosing the appropriate target airspeed $V_{max}$ and setting $A_{max}$ appropriately. For greater accuracies of airspeed V correlating to drag force F throughout the altitude envelope below $A_{max}$, the current air density at which the vehicle is presently at may be used in the equation if the chosen altitude sensor 28 can provide this data.

Event trigger signal ET cannot be generated unless airspeed V is below target airspeed $V_{max}$. The value of $V_{max}$ is set prior to system use, based on a variety of design considerations. Maximum drag force $F_{max}$ is next calculated by specifying target airspeed $V_{max}$, inputting the remaining known values, and solving Equation 1 for $F_{max}$. Event trigger signal generator 30 then stores $F_{max}$. Step 48 is complete when event trigger signal generator 30 determines measured drag force F is less than $F_{max}$. Equation 1 shows that completion of step 48 means that airspeed V is also less than target airspeed $V_{max}$. In this manner, the event trigger signal generator can generate the event trigger signal at a desired airspeed without actually measuring airspeed.

Due to the complex nature of parachute systems and the environment in which they operate, situations may exist where sensed drogue parachute drag force F never drops below $F_{max}$. Step 50 shows an optional ultimate redundant safety feature that may be incorporated into the functional method of parachute control system 22. Step 50 compares sensed time t to a constant value $t_{ultimate}$. When t exceeds $t_{ultimate}$, event trigger signal generator 30 generates event trigger signal ET even though F remains greater than $F_{max}$. Step 50 essentially forces event signal generator 30 to skip directly to step 56, event trigger signal generation, once a specified amount of time since drogue parachute deployment has elapsed and altitude is below $A_{max}$. In this manner, event trigger signal ET is generated despite imperfect drogue parachute function, but only after sufficient time has passed to allow drogue parachute 12 sufficient opportunity for normal function.

Step 52 is complete once event trigger signal generator 30 has stored the value of $t_1$. Time $t_1$ corresponds to measured time upon completion of either step 48 or step 48A. At step 48A, a comparison is again made of sensed drogue parachute drag force F to maximum drag force $F_{max}$. If F is no longer less than $F_{max}$, $t_1$ is reset at step 52. If F is less than $F_{max}$ at step 48A, the process continues to step 54.

Step 54 compares measured time to a time value corresponding to $t_1$ plus an additional time interval $t_f$. Time $t_f$ corresponds to a preset time interval for which F must remain below $F_{max}$. As long as the measured time is less than $t_1+t_f$, the process returns to step 48A, so that sensed force F must remain less than $F_{max}$ throughout the period $t_1+t_f$ or time $t_1$ will be reset. Step 54 is complete once t exceeds the value of $t_1$ plus $t_f$. Steps 48A and 54 ensure that false force readings produced by oscillations in generated drogue chute drag force do not induce event trigger signal generator 30 to prematurely generate the event trigger signal ET.

Once step 54 is completed, event trigger signal generator 30 is free to proceed to step 56. Step 56 generates event trigger signal ET, completing the event triggering scheme.

Figure 3:
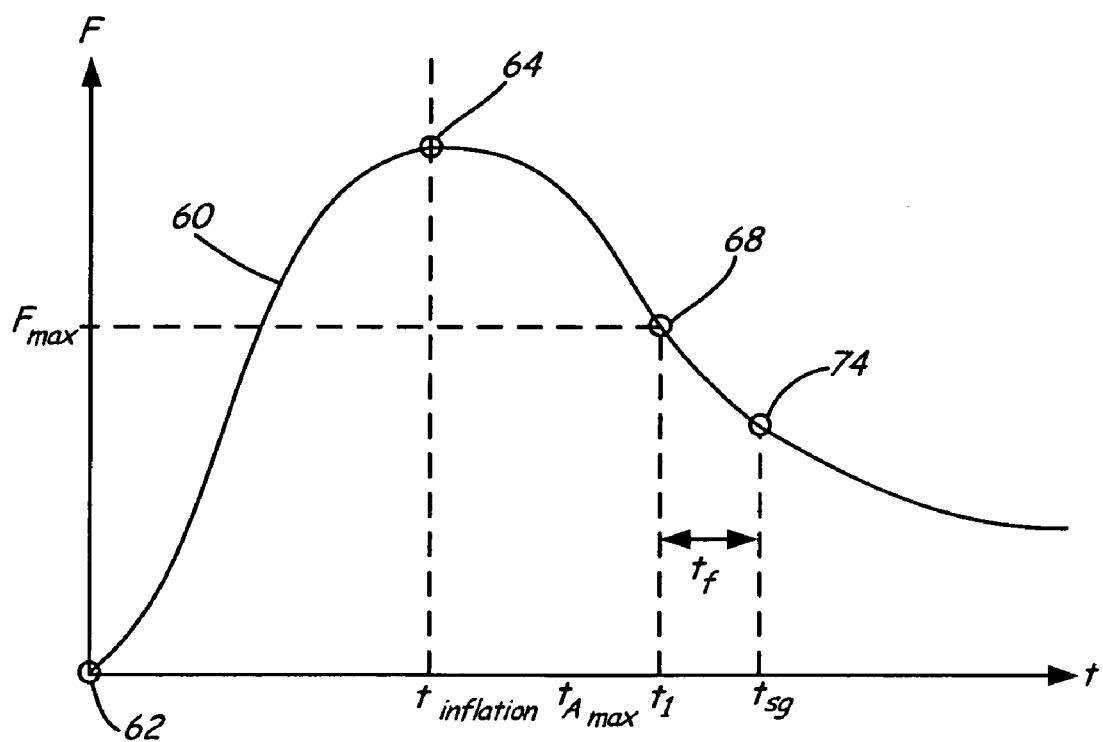
FIG. 3 illustrates graphically the logical parameters triggering the event signal as drogue parachute drag force varies over time.

Curve 60 on FIG. 3 graphically represents sensed drogue parachute drag force versus time. From FIG. 3 it is possible to see the method by which event trigger signal generator 30 generates event trigger signal ET primarily as a function of measured drogue parachute drag force F. Point 62 corresponds to initial drogue parachute deployment. By point 64, drogue parachute drag force has reached its maximum value. Inflation time $t_{inflation}$ is a preset value stored by generator 30 corresponding to the predetermined time in which the drogue parachute should be fully open, which may coincide with the point at which maximum drag force is reached. Following point 64, sensed drogue parachute drag force begins to decrease as drogue parachute 12 acts to slow the airspeed of its attached load.

Once sensed altitude falls below the preset maximum trigger altitude $A_{max}$, altitude no longer limits event trigger signal generation. Point 68 in FIG. 3 is reached when sensed drag force falls below the preset force threshold $F_{max}$. As discussed earlier, $F_{max}$ operates as a proxy for a target airspeed at which the event trigger signal is preferably generated. Once generator 30 senses that point 68 has been reached, it stores the corresponding time as $t_1$. Generator 30 recognizes point 74 when the sensed drogue parachute drag force has remained below the $F_{max}$ value for a time corresponding to the preset time interval $t_f$. The value of $t_1$ plus $t_f$ is labeled as $t_{sg}$. At point 74, event trigger signal ET is generated, and the progression is complete.

The present invention provides a parachute control system in which the event trigger signal is actuated primarily by drogue parachute drag force. This system may be integrated into a parachute system useful for cargo delivery, aircraft rescue, and many other applications. Because the event trigger signal generation system requires only altitude, drag force, and time value inputs, it is capable of functioning completely independent of host vehicle sensors. By using a known relationship between drag force and airspeed, however, the system remains capable of generating the event trigger signal at targeted airspeeds.

Although the present invention has been described with reference to preferred embodiments, workers skilled in the art will recognize that changes may be made in form and detail without departing from the spirit and scope of the invention.

The invention claimed is:

1. A parachute control system comprising:
    a force sensor for sensing drogue parachute drag force; and
    an event trigger signal generator for producing an event trigger signal after a first preset time has elapsed and after sensed drogue parachute drag force has remained below a preset maximum drag force for a second preset time interval.

2. The parachute control system of claim 1, further comprising an altitude sensor for sensing drogue parachute altitude, where the event trigger signal generator produces an event trigger signal after sensed altitude falls below a preset maximum altitude.

3. The parachute control system of claim 2, wherein the event trigger signal generator stores preset values for drogue parachute drag force, altitude, and time intervals defining an event trigger condition; compares sensed drogue parachute drag force, altitude, and time intervals to the preset values; and generates an event trigger signal once the event trigger condition is satisfied.

4. The parachute control system of claim 3, wherein the event trigger signal generator effects a redundant safety system by delaying the event trigger signal if a minimum drogue parachute drag force value is not sensed upon completion of the first time interval.

5. The parachute control system of claim 3, wherein the event trigger signal generator produces an event trigger signal independent of sensed drogue parachute drag force following completion of a third preset time interval.

6. A method of triggering further events following drogue parachute deployment, the method comprising:
    preventing event triggering prior to completion of a first time interval following drogue deployment sufficient to allow for full inflation of the drogue parachute;
    sensing altitude;
    preventing generation of an event trigger signal until sensed altitude is below a preset maximum altitude;
    sensing drogue parachute drag force;
    activating the event trigger signal when sensed drogue parachute drag force has remained below a preset maximum drag force for a second preset time interval.

7. The method of claim 6, wherein at least two discrete time intervals must be satisfied prior to event trigger signal generation.

8. The method of claim 6, wherein the preset maximum drogue parachute drag force corresponds to an expected drag force of a drogue parachute of known geometry and drag coefficient at a targeted airspeed.

9. The method of claim 6, where the preset maximum altitude corresponds to a maximum altitude at which a subsequent event may be safely triggered.

10. A parachute system, comprising:
    a drogue parachute;
    a drogue parachute deployment mechanism;
    a main parachute;
    a main parachute deployment mechanism;
    a sensor measuring drogue parachute drag force; and
    a controller that deploys the main parachute after a first preset time interval has elapsed and sensed drogue parachute drag force has remained below a preset maximum drag force for a second preset time interval.

11. The parachute system of claim 10, further comprising an altitude sensor for measuring altitude, wherein the controller deploys the main parachute after sensed altitude falls below a preset maximum altitude.

12. The parachute system of claim 10, further comprising a drogue parachute release mechanism, activated by the controller as a function of drogue parachute drag force and time.

13. The parachute system of claim 10, wherein the sensor measuring drogue parachute drag force functions independent of host vehicle systems.

14. The parachute control system of claim 10, wherein the first preset time interval corresponds to a standard time from drogue parachute deployment to full drogue parachute inflation for a specific vehicle and drogue parachute combination.

15. The parachute control system of claim 10, wherein the second preset time interval is sufficient to minimize risk of false event trigger signal generation due to oscillations in the drag force sensed.

16. The parachute control system of claim 1, wherein the event trigger signal generator comprises a programmable electronic controller.

17. The parachute control system of claim 1, wherein the first preset time interval corresponds to a standard time from drogue parachute deployment to full drogue parachute inflation for a specific vehicle and drogue parachute combination.

18. The parachute control system of claim 1, wherein the second preset time interval is sufficient to minimize risk of false event trigger signal generation due to oscillations in the drag force sensed.

* * * * *